United States Patent
Lion et al.

(10) Patent No.: US 7,833,453 B2
(45) Date of Patent: Nov. 16, 2010

(54) PROCESS FOR PRODUCING AN INJECTED ARTICLE THAT IS DECORATED BY FLOCKING WITHOUT USING A FLOCKING ADHESIVE

(75) Inventors: Jean-Pierre Lion, Laval (FR); Pierre Marie Congard, Saint Beerthevin (FR)

(73) Assignee: Societe d'Enduction et de Flockage, Laval (FR)

( * ) Notice: Subject to any disclaimer, the term of this patent is extended or adjusted under 35 U.S.C. 154(b) by 105 days.

(21) Appl. No.: 11/944,496

(22) Filed: Nov. 23, 2007

(65) Prior Publication Data

US 2008/0187706 A1 Aug. 7, 2008

(30) Foreign Application Priority Data

Nov. 24, 2006 (FR) .................................. 06 10321

(51) Int. Cl.
 *B29C 45/14* (2006.01)
(52) U.S. Cl. ........................ 264/243; 264/247; 264/275; 264/313
(58) Field of Classification Search ........................ None
 See application file for complete search history.

(56) References Cited

U.S. PATENT DOCUMENTS

| | | | | |
|---|---|---|---|---|
| 4,470,857 | A | * | 9/1984 | Casalou ........................ 156/66 |
| 4,726,975 | A | * | 2/1988 | Hatch ........................... 428/100 |
| 4,842,916 | A | * | 6/1989 | Ogawa et al. ................ 428/100 |
| 5,922,436 | A | * | 7/1999 | Banfield et al. ............. 428/100 |
| 6,929,771 | B1 | * | 8/2005 | Abrams ........................ 264/511 |
| 7,338,697 | B2 | * | 3/2008 | Abrams ......................... 428/90 |
| 2003/0207072 | A1 | * | 11/2003 | Abrams ......................... 428/90 |

* cited by examiner

*Primary Examiner*—Edmund H. Lee
(74) *Attorney, Agent, or Firm*—Young & Thompson

(57) ABSTRACT

Process for producing an injected article to which a flocked decoration is applied that includes the production of a flocked substrate (11) based on a temporary substrate (1) covered by a temporary adhesive (2) that keeps the flock fibers (3) in place, positioning of the flocked substrate in an injection mold of the article to be produced, injection of a polymer (12) being melted in the closed mold through an injection opening (4), removal of the injected article from the mold and the peeling off of the temporary substrate (1) and the temporary adhesive (2) from the injected article, characterized in that the flocked substrate (11) is positioned in the mold so that the flock fibers (3) are oriented toward the interior of the mold.

19 Claims, 2 Drawing Sheets

PROCESS FOR PRODUCING AN INJECTED ARTICLE THAT IS DECORATED BY FLOCKING WITHOUT USING A FLOCKING ADHESIVE

The field of this invention is that of articles made by injection and decorated with a flocked surface.

Many processes are currently in use for making such articles, such as 3D flocking, the insert molding process or else the implementation of the process developed by the company High Voltage Graphics.

The 3D flocking process consists in a projection of adhesive and fibers at the same time onto the surface of the article to be decorated, injected beforehand. This process makes it possible to produce articles of relatively complex shape (of the glove compartment type for a motor vehicle, for example). The process has a certain number of disadvantages: it leads to a generally disagreeable feel dictated by the necessity of using rough fibers; it has an appearance that is always uniform and monochromatic, and reproducibility that is reduced from article to article.

In a second process, the surface to be decorated is flocked onto a heat-forming substrate such as, for example, polystyrene, ABS polymer, or a polycarbonate. The substrate that has been flocked in this way is heat-formed and cut. The resulting article is then placed in an injection mold. The injected polymer is intended to ensure the link between the substrate of the heat-formed article and the remainder of the injected article.

With this process, it is, however, a good idea to properly select the flocking adhesive that must be able to be heat-formed; this can greatly limit resistance in terms of cleaning, abrasion, etc. It is likewise necessary for the quality of the fibers to be such that they can withstand high pressures and a high temperature during injection. A poor choice of fibers entails their irreversible crushing and thus a very significant loss of feel. A previous patent application filed under No. FR 05.05379 describes a method allowing significant limitation of this disadvantage by implementing flocks in super microfibers of polyester in applications such as hot-bonding, heat-forming or hot compression (hot molding of articles covered with a flocked substrate), mold decoration, better known to ones skilled in the art under the designation "decoration in mold," or any other similar operation.

Finally, the last process is based on the principle of transfer of a flock from one temporary substrate comprising a temporary adhesive to a second substrate comprising the flocking attachment adhesive that is itself attached to the article to be produced, a textile for example. It has the disadvantage of ending up with a construction of products that is relatively complex and thus a priori expensive.

The purpose of this invention is to suggest a process for producing injected articles that are decorated using a flocked surface while avoiding some of the aforementioned disadvantages. In particular, this process makes it possible to obtain a flocked article that is decorated during the injection operation (by a process of the type IMD, Insert Molding, SMC, etc. . . . ) without the flock fibers being attached to the injected article using some adhesive.

For this purpose, the object of the invention is a process for producing an injected article to which a flocked decoration is applied that comprises the production of a flocked substrate based on a temporary substrate covered by a temporary adhesive that keeps the flock fibers in place, positioning of said flocked substrate in an injection mold of said article to be produced, injection of a polymer being melted in said closed mold through an injection opening, removal of the injected article from the mold and a peeling of the temporary substrate and of the temporary adhesive from the injected article, characterized in that the flocked substrate is positioned in said mold such that the flock fibers are oriented toward the interior of said mold.

The positioning of the fibers in the direction of the interior of the mold allows them to be taken into the injected polymer and to be attached without having to provide a flocking attachment adhesive. The flock fibers are thus transferred from the temporary substrate and remain attached permanently to the injected article.

Advantageously, the density of flock fibers is greater than one billion fibers per square meter.

In one particular embodiment of the invention, the temporary adhesive is a thermosetting polymer.

Preferably, the temporary adhesive is chosen in the family of silicone rubbers.

Such a temporary adhesive makes it possible to obtain attachment sufficient for holding the fibers during production of the injected article, without preventing the subsequent peeling, while resisting conditions of injection temperature and pressure.

Advantageously, the temporary substrate is a polyester terephthalate film.

In one particular embodiment, the temporary substrate is a non-woven substrate with polyester fibers or a paper substrate.

Such a temporary substrate allows resistance to conditions of temperature and pressure of injection.

In one particular embodiment, the temporary substrate can be heat-formed.

In another embodiment, the temporary substrate can be deformed under the action of pressure.

In still another embodiment, the temporary substrate can be deformed by mechanical action.

Preferably, the flock fibers are a polymer of the polyamide or polyester type.

Such fibers, especially the polyester super microfibers described in the preceding patent application, are particularly well adapted to production of the desired injected articles.

In one particular embodiment, the flock fibers are embossed before injection.

In another embodiment, the flock fibers are imprinted by sublimation before injection, or else embossed and imprinted by sublimation before injection.

Advantageously, the flock fibers and the injected polymer are produced in the same material.

In one preferred embodiment, said fibers and said polymer are from the polyamide, polypropylene or polyester terephthalate family.

Such a common choice for an injected article and for "flock" fibers allows easy recycling of the combination at the end of the service life.

The invention will be better understood, and other objectives, details, characteristics and advantages of the latter will be clarified during the detailed explanatory description below of one embodiment of the invention given by way of a purely illustrative and nonlimiting example, with reference to the attached schematics.

Figure 1:
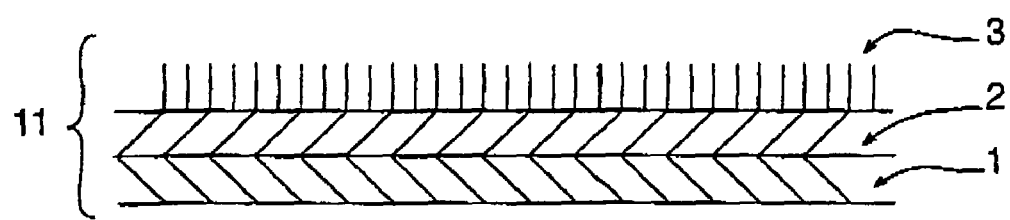
FIG. 1 is a cutaway view of a flocked substrate.
Figure 4A:
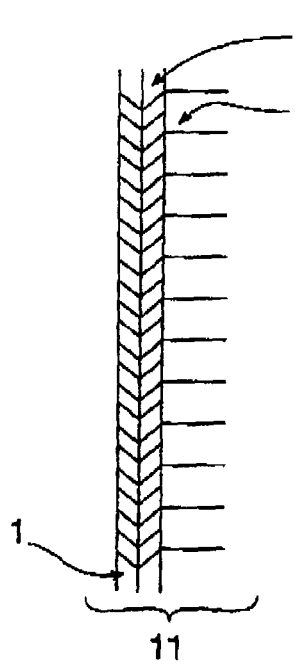
FIGS. 4a to 4c are cutaway views of the flocked substrate in position in the mold of FIG. 2 before, during and after injection.

FIGS. 1 and 4a show a flocked substrate 11 composed of a temporary substrate 1 to which an adhesive layer, i.e., temporary adhesive 2, has been applied, and the fibers comprising the flock 3. These fibers are positioned transversely to the surface of the temporary substrate 1, as results from the classic process of flocking and are kept in place by the temporary adhesive 2.

Figure 2:
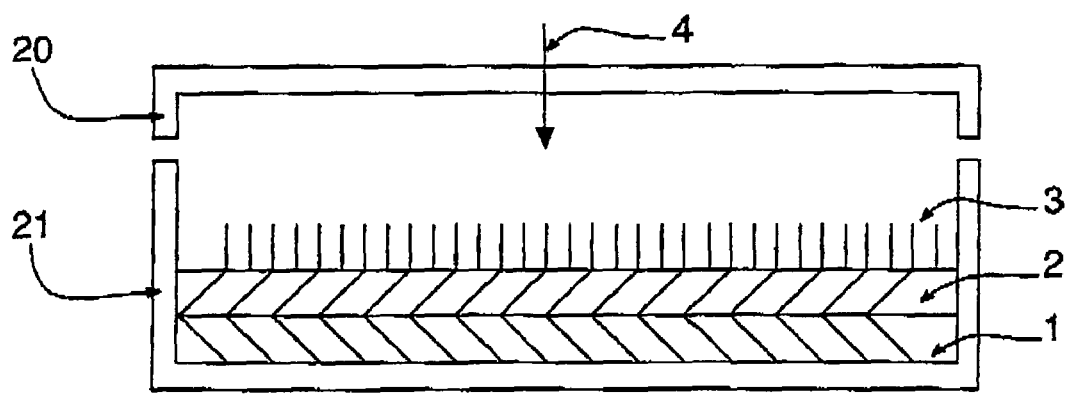
FIG. 2 is a cutaway view of a flocked substrate in position in a mold according to the invention, prior to injection.

FIG. 2 shows a flocked substrate 11 in a mold composed of a first part 20 and a second part 21 on which the flocked substrate 11 is positioned. The first part 20 of the mold is perforated by an opening 4 designed to allow injection of a polymer as it melts.

Figure 3:
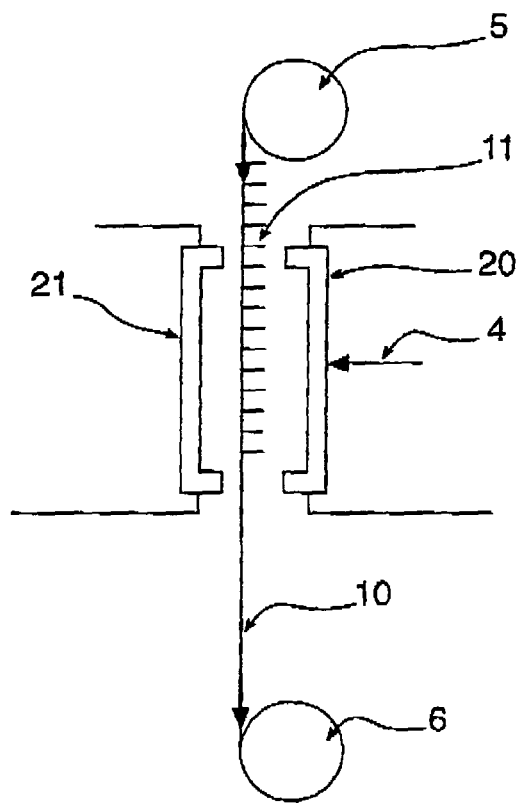
FIG. 3 is a cutaway view of a flocked substrate in position in a mold according to the invention, with substrate delivery and take-up spools before and after injection.

FIG. 3 shows an In Mold Decoration (IMD) process in which the flocked substrate 11 is unrolled from a first spool 5, then passes through a mold of the type shown in FIG. 2. During this passage, a polymer 12 as it melts is injected through the opening 4 to produce the injected piece and will be deposited on the flocked substrate. After injection, the substrate 10, which no longer bears any fibers because they have been held by the polymer and are then attached to the injected article, is taken up onto a second spool 6.

Figure 4B:
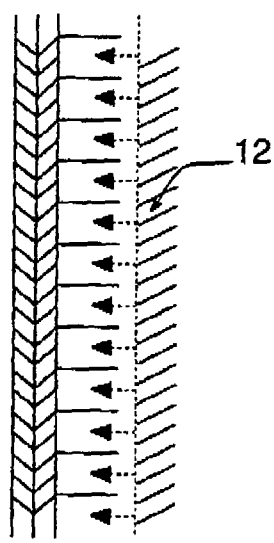
Figure 4C:
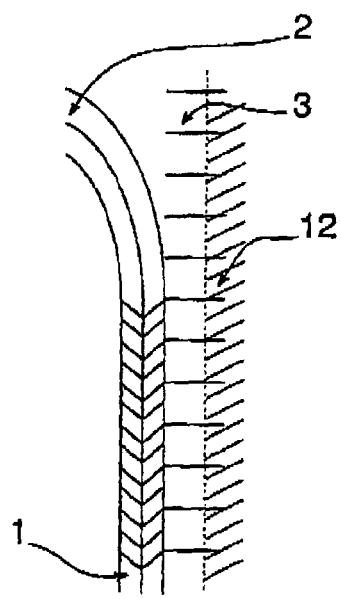

FIGS. 4a to 4c show the flocked substrate 11 positioned in the mold according to FIG. 2 before the polymer injection phase (FIG. 4a), then the injection phase of the polymer 12 onto the flocked surface (FIG. 4b), and finally the phase of peeling of the temporary substrate 1 and of the temporary adhesive 2 (FIG. 4c). The flock fibers 3 remain attached permanently in the polymer 12.

The different stages of the implementation of an injected article that is decorated with a flocked surface according to the invention will now be described.

First of all, the "flock" fibers 3 are deposited in the traditional manner onto a temporary substrate 1 covered with a layer of temporary adhesive 2 so as to produce a flocked substrate 11. The fibers comprising the flock are generally projected through an electrostatic field that allows regular and homogeneous implantation. They are kept in place on the flocked substrate by way of the temporary adhesive that had been deposited beforehand.

The uniform appearance of these fibers can be modified by embossing and/or imprinting, as described in detail below.

The density of the flock fibers (number of fibers per cm2) is extremely elevated, typically 60 grams of fibers per square meter. With fibers of titer 0.9 dtex and diameter 0.5 mm, there are several billion fibers per square meter of the flocked product. Combined with their very high number, the fiber plus air complex thus forms a very efficient air cushion that offers good properties of sound and heat insulation.

The fibers can be of any nature (polyamide, polyester, rayon-viscose, etc. . . . ). The treatment that allows them to be implemented by an electrostatic field will sometimes have to be chemically compatible with the polymer that will be injected in order to ensure good attachment of the fibers.

The temporary substrate 1, as for itself, must be able to support the conditions implemented during injection (high temperature and high pressure). For this purpose, as possible candidates for production of the temporary substrate 1, it is possible to cite polyester terephthalate films, non-woven substrates with polyester fibers, paper substrates, etc.

To produce the flocked substrate 11, the flock fibers 3 must be fixed by a temporary flocking adhesive 2. The latter will be chosen to allow the fibers to be easily kept on the temporary substrate 1. This temporary holding must nevertheless allow embossing operations and/or operations of imprinting by sublimation, both requiring increased temperatures and pressures. The temporary adhesive 2 will be preferably composed of a thermosetting polymer in order to support, also for itself, the conditions implemented during injection. At the same time, it will have to offer good elasticity for purposes of its deformability to take the shape of the mold during injection. The family of silicone rubbers satisfies this definition (Dow Corning 3730 or Rhodia RTV 3428).

In one variant of the invention, the "flock" fibers applied to the temporary substrate are transformed before being placed in the injection mold. Their appearance can be modified by hot embossing: the fibers are crushed selectively by a heated and engraved cylinder, pressed strongly against the temporary flocked substrate. It can likewise be modified by multi-color printing: Patent Applications FR 0408626 and FR 0505379 of the same applicant describe different methods allowing a multicolor appearance to be imparted to the flocked surface, and these possibilities can be applied in the case of this invention.

Once the flocked substrate 11 is implemented, it can be stored on a first spool 5 like the one described in FIG. 3. It is then placed in a mold of the type described in FIG. 2, i.e., comprising a first part 20 in which there is an opening 4 and a second part 21 that supports the flocked substrate 11. The flocked substrate is positioned with the temporary substrate oriented facing the mold, in contrast to the preceding processes in which it is the fibers that have been placed facing the mold.

For producing each of the injected articles, a certain length of the flocked substrate that corresponds to the decoration to be applied is introduced into the mold; it is then closed and injection of the polymer 12 as it is melted is done through the opening 4. The polymer first traverses the surface of the mold to form an external skin and will immerse the portion of the fibers applied to the flocked substrate 11. The volume of the mold is then filled so as to obtain the desired injected article, imparting to it the desired shape.

The injected polymer thus plays a double role: that of the material of the injected article and that of an adhesive for attaching fibers to the article that has been decorated in this way. Accordingly, in the production according to the invention, the adhesive that ensures definitive attachment of the fibers to the final article is eliminated.

There is the danger that, the injection being done alongside the fibers, the latter are flattened or oriented, or at worst raised or immersed by the polymer flow. The flocked layer, as described, however, offers enough resistance to the polymer flow during injection for the fibers to be only slightly oriented, but in no case immersed.

The injected article is then removed from the mold and a new cycle of introduction of the flocked substrate and of injection of the polymer can be initiated to produce the following article.

Upon leaving the mold, the injected article not yet having returned to ambient temperature, the temporary substrate 1 and its temporary adhesive 2 are separated by peeling off from the injected article, as is indicated in FIG. 4c. The fibers are definitively attached by the injected polymer 12 and the substrate 10, with the flock fibers removed, is recovered, and, for example, taken up onto a second spool 6.

To allow peeling off from the temporary substrate 1 with transfer of the fibers, what matters is to pay attention to the choice of temporary adhesive in order that the force of attachment of the fibers in the temporary adhesive 2 is less than the force of attachment of the fibers in the injected polymer 12.

Finally, the performance of the fibers can be controlled by, for example, scratching and cleaning tests.

Another advantage of this invention of particular interest is that the fibers and the injected polymer can be from the same family, especially polyamide, polypropylene or polyester terephthalate. It is then possible to recycle the article when it has a production fault or it has exhausted its service life. This aspect is especially noteworthy since recycling of injected and decorated articles is currently extremely expensive; in fact, it requires carrying out a very difficult operation of separation of different materials to allow their recycling.

This invention thus offers the possibility of producing decorated, injected articles of a single material; this does not currently exist under technical and economic conditions superior to current conditions.

Although the invention has been described in relation to a specific embodiment, it is quite apparent that it is in no way limited and that it comprises all technical equivalents of the means described as well as their combinations if the latter fall within the framework of the invention.

The invention claimed is:

1. Process for producing an injected article to which a flocked decoration is applied, comprising the steps of:
   forming a flocked substrate by covering a surface of a temporary substrate (1) with a temporary adhesive (2) that keeps flock fibers (3) in place with the temporary adhesive keeping the flock fibers (3) positioned transversely to the surface of the temporary substrate;
   positioning the flocked substrate in an injection mold comprised of i) a first part perforated by an polymer injection opening, and ii) a second part onto which the temporary substrate of the flocked substrate is positioned and so that free ends of the flock fibers face the first part;
   closing the injection mold; and
   injecting a melted polymer (12) through the polymer injection opening of the closed mold and towards the free ends of the flock fibers thereby producing the injected article with the polymer deposited on the flocked substrate; and
   removing the injected article from the mold and peeling off the temporary substrate (1) and the temporary adhesive (2) from the injected article so that the injected article has the flock fibers attached thereto.

2. Process for producing an injected article provided with a decoration by flocking according to claim 1, wherein the density of the flock fibers (3) is greater than one billion fibers per square meter.

3. Process for producing an injected article according to claim 1, wherein the temporary adhesive (2) is a thermosetting polymer.

4. Process for producing an injected article according to claim 3, wherein the temporary adhesive (2) is chosen in the family of silicone rubbers.

5. Process for producing an injected article according to claim 1, wherein the temporary substrate (1) is a polyester terephthalate film.

6. Process for producing an injected article according to claim 1, wherein the temporary substrate (1) is a non-woven substrate with polyester fibers or a paper substrate.

7. Process for producing an injected article according to claim 1, wherein the temporary substrate (1) can be heat-formed.

8. Process for producing an injected article according to claim 1, wherein the temporary substrate (1) can be deformed under the action of pressure.

9. Process for producing an injected article according to claim 1, wherein the temporary substrate (1) can be deformed by mechanical action.

10. Process for producing an injected article according to claim 1, wherein the flock fibers (3) are made of a polymer of the polyamide or polyester type.

11. Process for producing an injected article according to claim 1, wherein the flock fibers (3) are embossed before injection.

12. Process for producing an injected article according to claim 1, wherein the flock fibers (3) are imprinted by sublimation before injection.

13. Process for producing an injected article according to claim 1, wherein the flock fibers (3) and the injected polymer (12) are made of the same material.

14. Process for producing an injected article according to claim 13, wherein said fibers and said injected polymer are from the family of polyamide, polypropylene or polyester terephthalate.

15. Process for producing an injected article according to claim 2, wherein the temporary adhesive (2) is a thermosetting polymer.

16. Process for producing an injected article according to claim 2, wherein the temporary substrate (1) is a polyester terephthalate film.

17. Process for producing an injected article according to claim 3, wherein the temporary substrate (1) is a polyester terephthalate film.

18. Process for producing an injected article according to claim 4, wherein the temporary substrate (1) is a polyester terephthalate film.

19. Process for producing an injected article according to claim 2, wherein the temporary substrate (1) is a non-woven substrate with polyester fibers or a paper substrate.

* * * * *